UNITED STATES PATENT OFFICE.

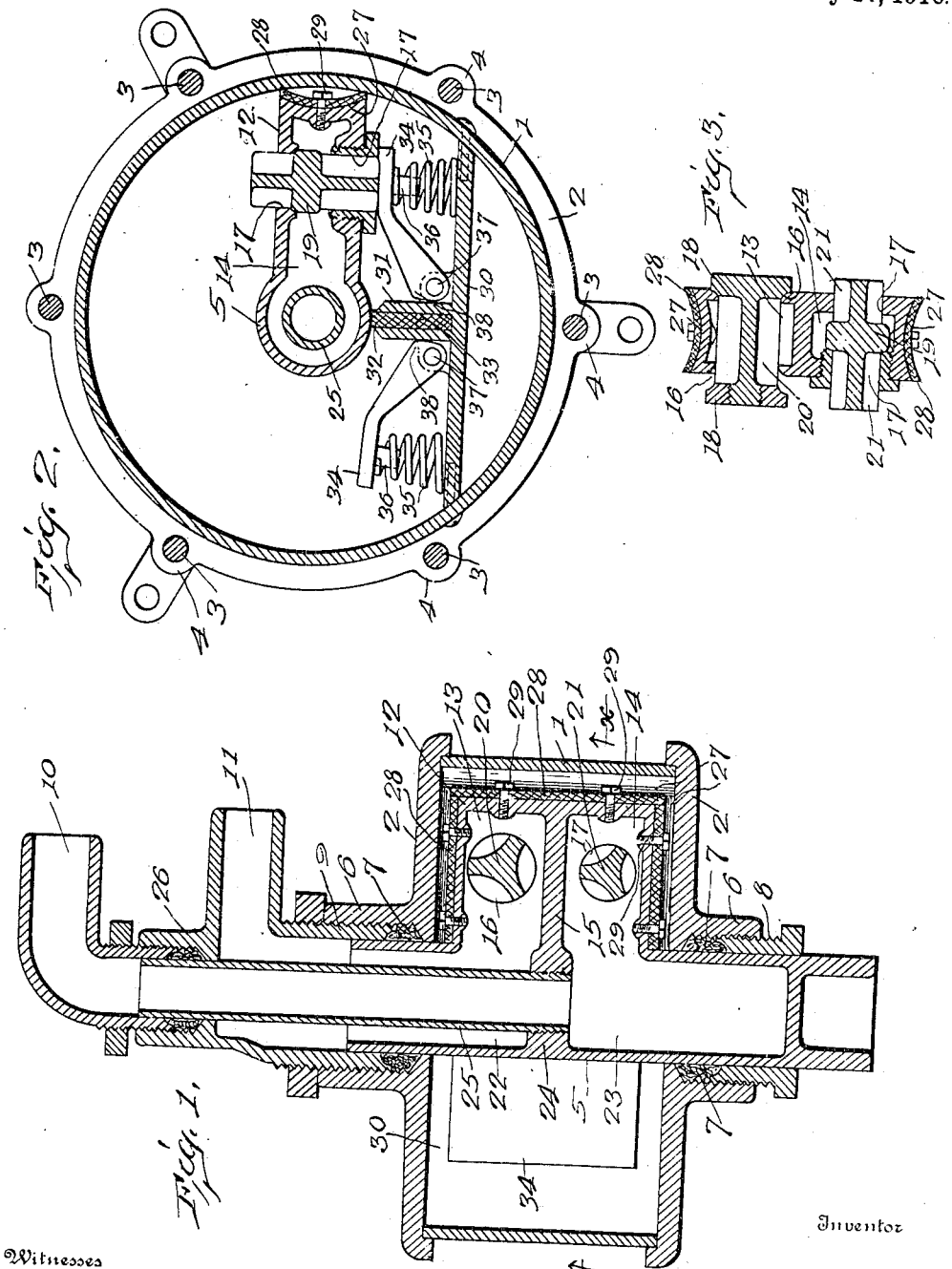

HARRY W. MEZGER, OF SPRINGFIELD, OHIO.

WATER-MOTOR.

958,152.

Specification of Letters Patent. Patented May 17, 1910.

Application filed May 3, 1909. Serial No. 493,447.

*To all whom it may concern:*

Be it known that I, HARRY W. MEZGER, a citizen of the United States, residing at Springfield, in the county of Clark and State of Ohio, have invented certain new and useful Improvements in Water-Motors, of which the following is a specification, reference being had therein to the accompanying drawings.

This invention relates to water motors and the object of the invention is to provide an oscillating water motor, the construction of which will be very simple and of such a character as to facilitate the assembling of the machine in the course of its manufacture; which will be provided with means for positively, quickly and simultaneously reversing the valves; and which will have the inlet and outlet arranged in a convenient and easily accessible position.

With these objects in view my invention consists in certain novel features and in certain combinations and arrangements of parts hereinafter to be described, and then more particularly pointed out in the claims.

In the accompanying drawings, Figure 1 is a vertical sectional view taken centrally through a motor embodying my invention; Fig. 2 is a transverse sectional view, taken on the line x x of Fig. 1 and looking in the direction of the arrows; and Fig. 3 is a sectional detail view of the valves.

In these drawings I have illustrated one embodiment of my invention and have shown the same as consisting of a cylinder comprising a body portion 1 having its opposite ends closed by cylinder heads 2 which are connected one to the other by means of rods 3 extending through apertured ears 4 carried by each cylinder head. Each cylinder head 2 is provided with a central opening which forms a bearing for the motor shaft 5 which extends beyond the cylinder heads 2 and has one end adapted to be connected to the mechanism to be operated. Suitable stuffing boxes are formed about the shaft 5 at each end thereof by providing each of the cylinder heads with outwardly extending annular flanges or bosses 6 surrounding the central openings therein. These bosses are of an internal diameter greater than the external diameter of the shaft and are adapted to receive a suitable packing 7 which is retained therein by means of a gland 8 which fits snugly about the adjacent end of the shaft and is screw-threaded into the boss 6. At the lower end of the shaft 5 the gland is of ordinary construction, but at the upper end thereof it comprises a part of the housing 9 into which the upper end of the shaft 5 extends and which is provided with a suitable nipple or connection 10 for connecting the same with the inlet pipe, and a second nipple or connection 11 for connecting the same with the outlet pipe. The lower portion of the housing 9 is screw-threaded to fit within the boss 6 and serves as a retaining plug or cap for the packing 7 which is contained in the stuffing box.

A piston 12 is rigidly secured to and preferably formed integral with the shaft 5. This piston is provided with two chambers 13 and 14. In the present instance, these chambers are formed by casting, or otherwise forming, the piston 12 hollow and dividing the same by a horizontal partition 15 arranged substantially midway between the upper and lower edges thereof and thereby dividing the same into two chambers, one of which comprises the inlet chamber and the other the outlet chamber. Each of the chambers 13 and 14 is provided in the opposite sides thereof with openings 16 and 17, respectively, which are controlled by valves 18 and 19 and by means of which the chambers 13 and 14 may be placed in communication with the interior of the cylinder 1 on either side of the piston. These valves are here shown of ordinary construction and are so arranged that, when the valves are both moved to the limit of their movement in one direction, the opening of one chamber in one face of the piston will be open and the corresponding opening of the other chamber will be closed. To this end the valves in the upper chamber are seated on the outside of the piston and are connected by winged guides 20, while the valves 19 are formed in a single piece and are mounted within the chamber, seating against the inner edges of the openings and are provided at their outer ends with winged guides 21. The lengths of the valve members 18 and 19, with their respective guides, are substantially the same so that, when the valves have been moved to the limit of their movement in the same direction, the outer ends thereof will extend substantially the same distance from the face of the piston on each side thereof.

The chambers 13 and 14 are preferably connected with the inlet and outlet by means of passages formed in the motor shaft 5 and connected at their outer ends to the outlet and inlet 11 and 10, respectively, and at their inner ends to the chambers 14 and 13, respectively. In the present instance, I have provided these passages by forming the shaft 5 hollow and dividing the same into upper and lower compartments 22 and 23 by means of a horizontal partition 24 forming a continuation of the partition 15 which divides the hollow piston 12 into two chambers. The upper compartment 22 of the hollow shaft 5 is in direct communication with the upper chamber 13 of the piston and the upper end of the shaft opens into the housing 9 and is thus directly connected with the outlet 11. The lower compartment 23 of the hollow shaft 5 is in direct communication with the lower chamber 14 of the hollow piston and is connected with the inlet 10 by means of a conduit or pipe 25 which extends through the outlet passage, formed by the upper compartment 22 and the housing 9, and has its lower end extending through the partition 24 and preferably screw-threaded into that partition. The upper end of the pipe 25 extends through a suitable stuffing box 26 formed in the upper part of the housing 9 and into the nipple 10 which forms the inlet. Thus it will be apparent that, in the operation of the device, the water will be admitted through the inlet passage comprising the lower compartment of the shaft 5, through the chamber 14 and one of the openings 17 into the cylinder and that it escapes from the cylinder through one of the openings 16 of the chamber 13 of the piston into the outlet passage comprising the upper compartment 23 of the shaft and the pipe or conduit 25; and that by this arrangement of the inlet and outlet passages I am enabled to place the connections for the supply and exhaust pipes in a most convenient and easily accessible position. It is obvious that, while I have described the upper chamber of the piston and the upper compartment of the shaft as the outlet and the lower chamber of the piston and the lower compartment as the inlet, this arrangement could readily be reversed without interfering with the operation of the motor.

The piston 12 preferably has its three edges, which are in engagement with the walls of the cylinder, concave, as shown at 27, and provided with a packing 28 which is secured thereto near the center of the edge of the piston by bolts 29, this packing following the contour of the concave edge of the piston and engaging the wall of the cylinder at two points only, thus materially reducing the friction between the piston and the cylinder and at the same time preventing the passage of water between the cylinder and the edge of the piston.

It is necessary that an abutment or partition of some character should be arranged between the shaft 5 and the outer wall of the cylinder on one side of the piston, and, to this end I have provided a chord-wise partition 30 which extends across the cylinder at a point substantially midway between the shaft 5 and the wall of the cylinder and has an inwardly extending or radially arranged partition 31 extending longitudinally of the shaft 5 and provided with a packing 32 bearing against the outer surface of the shaft and forming a water-tight joint between the shaft and the partition 31. The partition 31 is preferably provided with a longitudinal recess 33, which, in the present instance, is shown as extending the full depth of the partition, in which the packing 32 is secured. In order that the valves may be simultaneously and quickly reversed when the piston has reached one limit of its movement I have movably mounted on the chord-wise partition 30 two plates 34 extending longitudinally of the piston and of a length sufficient to engage both of the valves mounted therein. These plates are supported in their normal positions by means of springs 35 which are arranged between the lower sides of the plates 34 and the chord-wise partition and are held against movement relatively to the plate 34 by means of pins or projections 36, about which the upper ends of the spring are tightly coiled. The plates 34 are preferably pivotally mounted on the partition 30 at a point near the point of union of the chord-wise partition 30 and the radial partition 31, this connection being preferably made by means of pivot pins 37 which extend loosely through the inner ends of the plates 34 and permit of a slight amount of lost motion or wabbling movement in the plate, thereby enabling the same to adjust itself to any slight irregularities in the lengths of the two valves and avoiding the necessity for fine adjustments of these valves. The piston is arranged to move through an arc of 180 degrees and the plates 34 are normally supported in such a position that, as the piston approaches the limit of its movement in one direction, one of the plates will engage the projecting ends of the valve members 18 and 19. The pressure of water against the valve members will tend to resist the movement of the same and the valves will not be shifted until the springs 35 have been compressed to a greater or less extent, and the combined action of the piston and spring is sufficient to overcome the pressure of the water, when the valves will be quickly shifted from one position to the other, thereby positively and simultaneously reversing the positions of the valves and the flow of the water, and, consequently, reversing the direction of movement of the piston. The plates 34 are provided with squared stops or shoulders 38 adapted to engage the partition 31 and limit the upward movement of the plates and prevent their being thrown into an inoperative position by the action of the spring 35.

The operation of the motor has been described in connection with the description of the several parts thereof and it will be apparent that I have provided an oscillating motor, the construction of which is exceedingly simple and is of such a character as to greatly facilitate the assembling of the motor, it being immaterial which is the upper and which is the lower end of the cylinder; the piston and the shaft fitting equally well when inserted from either side and the bosses 6 being of the same size. It will also be apparent that I have so constructed the piston as to materially reduce the friction caused by the engagement between the piston and the walls of the cylinder and that I have provided means for simultaneously, positively and quickly reversing the positions of the valves, and, consequently, shifting the flow of water from one side of the piston to the other. It will further be obvious that the detail construction and arrangement of the several parts of the motor are susceptible to a wide range of modification and I, therefore, wish it to be understood that I do not desire to be limited to the details of construction shown and described, for obvious modifications will occur to a person skilled in the art.

Having thus fully described my invention, what I claim as new and desire to secure by Letters Patent, is:—

1. A motor comprising a cylinder, a shaft journaled in said cylinder, a piston carried by said shaft and having two chambers, each of said chambers having openings in the opposite sides thereof, and valves to control said openings, said shaft having two passages, one of said passages being connected at its inner end with one of the chambers in said piston and the other of said passages being connected at its inner end to the other chamber in said piston and comprising a pipe extending through the first-mentioned passage, said passages being connected at their outer ends to the inlet and outlet pipes, respectively.

2. A motor comprising a cylinder, a hollow shaft journaled in said cylinder, a piston carried by said shaft and having two chambers therein, one of said chambers being in communication with said hollow shaft, a pipe extending through a portion of said hollow shaft and in communication with the other chamber of said piston, each of said hollow chambers having openings in the opposite sides thereof, and valves for controlling said openings.

3. In a motor, a cylinder, a hollow shaft journaled therein, a transverse partition dividing said hollow shaft into two compartments, a hollow piston carried by said shaft, a partition dividing said hollow piston into two chambers, each of said chambers having openings in the opposite sides thereof, valves controlling said openings, each of said chambers being in communication with one of the compartments of said hollow shaft, an outlet pipe communicating with one compartment of said hollow shaft, a pipe extending through said compartment and in communication with the second compartment, and an inlet pipe in communication with said pipe.

4. In a motor, a cylinder, a hollow shaft journaled in said cylinder, a transverse partition dividing said hollow shaft into two compartments, a housing secured to one end of said cylinder and surrounding the end of said hollow shaft, said housing having an inlet opening and an outlet opening, one of said openings being in direct communication with the interior of said housing, a pipe connected with the other of said openings, extending through said housing and having its opposite end extending through the partition in said hollow shaft, a piston carried by said shaft and having two chambers therein, each of said chambers being in communication with one of the compartments of said hollow shaft and each of said chambers having openings in the opposite sides thereof, and valves for controlling said openings.

5. In a motor, a cylinder comprising a body portion and cylinder heads at the opposite ends thereof, a hollow shaft journaled in said cylinder heads, bosses extending outwardly from each of said cylinder heads, said bosses being of a uniform diameter and adapted to receive a packing, a gland adapted to encircle said shaft and enter one of said bosses, a housing adapted to receive one end of said hollow shaft and enter the other of said bosses, said housing having an outlet, a piston secured to said shaft and having two chambers, each of said chambers having openings in the opposite sides thereof, valves controlling said openings, and inlet and outlet passages formed in said shaft and connected with the respective chambers in said piston.

6. In a motor, the combination, with a cylinder, a shaft journaled therein and having two passages, a piston carried by said shaft and having two chambers communicating with the respective passages in said shaft, each of said chambers having openings in the opposite sides thereof, and valves controlling said openings, of a partition arranged in said cylinder, and a rigid plate movably mounted on each side of said partition and adapted to actuate the valves in said piston.

7. In a motor, the combination, with a cylinder, a shaft journaled therein and having two passages, a piston carried by said shaft and having two chambers communicating with the respective passages in said shaft, each of said chambers having openings in the opposite sides thereof, and valves controlling said openings, of a partition arranged in said cylinder, a rigid plate movably mounted on each side of said partition and adapted to actuate the valves in said piston, and springs for retaining said plates in their normal positions.

8. In a motor, the combination, with a cylinder, a shaft journaled therein, a piston carried by said shaft and having openings therein, and valves controlling said openings, of a partition arranged in said cylinder, a rigid plate movably mounted on each side of said partition and adapted to actuate the valves in said piston, and stops to limit the movement of said plates.

9. In a motor, the combination, with a cylinder, a shaft journaled therein, a piston carried by said shaft and having openings therein, and valves for controlling said openings, of a chord-wise partition arranged in said cylinder, plates pivotally mounted on said chord-wise partition on opposite sides of the center thereof and arranged in the path of the valves in said piston, and resilient means for retaining said plates in their normal positions.

10. In a motor, the combination, with a cylinder, a shaft journaled therein, a piston carried by said shaft and having openings therein, and valves for controlling said openings, of a chord-wise partition arranged in said cylinder, plates pivotally mounted on said chord-wise partition on opposite sides of the center thereof and arranged in the path of the valves in said piston, a spring to retain said plates in their normal position, and stops to limit the movement of said plates about their pivotal centers.

11. In a motor, the combination, with a cylinder, a shaft journaled therein, a piston carried by said shaft having openings therein, and valves to control said openings, of a chord-wise partition arranged in said cylinder, a radial partition mounted on said chord-wise partition and extending between the same and said shaft, plates pivotally mounted on one side of said chord-wise partition on the opposite sides of said radial partition, and springs interposed between said plates and said chord-wise partition.

12. In a motor, the combination, with a cylinder, a hollow shaft mounted therein and having two compartments, said compartments having an inlet and an outlet, respectively, a hollow piston carried by said shaft and having two chambers, each of said chambers communicating with one of the compartments of said hollow shaft, each of said chambers having openings in the opposite sides thereof, and valves for controlling said openings, of a chord-wise partition arranged in said cylinder, plates pivotally supported on said chord-wise partition and arranged in the paths of the valves in said piston at the opposite limit of the movement of said piston, and springs interposed between said plates and said chord-wise partition.

In testimony whereof, I affix my signature in presence of two witnesses.

HARRY W. MEZGER.

Witnesses:
ELZA F. McKEE,
EDWARD L. REED.